April 27, 1965  J. N. CORDEA ETAL  3,180,021
WELD JOINT BACKING AND METHOD OF WELDING WITH SAME
Filed Nov. 21, 1962
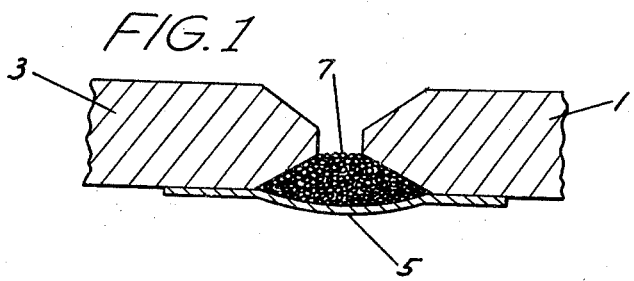
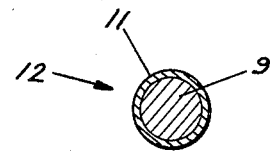
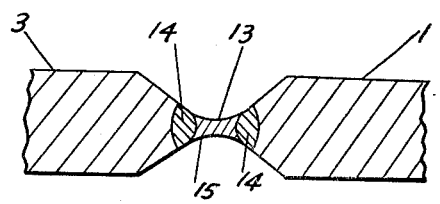
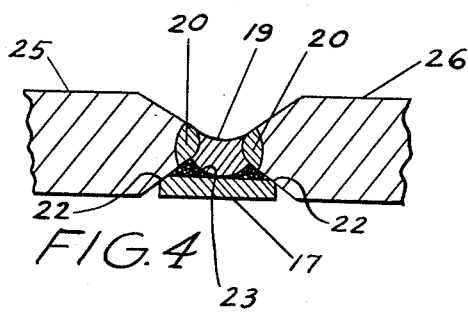
JAMES N. CORDEA
ROBERT M. EVANS
PERRY J. RIEPPEL
INVENTORS
BY S. J. Rotondi
A. T. Dupont
and C. R. White
ATTORNEYS

United States Patent Office 3,180,021
Patented Apr. 27, 1965

3,180,021
WELD JOINT BACKING AND METHOD OF WELDING WITH SAME
James N. Cordea and Robert M. Evans, Columbus, and Perry J. Rieppel, Worthington, Ohio, assignors, by mesne assignments, to the United States of America as represented by the Secretary of the Army
Filed Nov. 21, 1962, Ser. No. 239,386
4 Claims. (Cl. 29—483)

The present invention relates generally to improvements in the art of welding and particularly relates to loose particle backing materials used to support molten weld metal in the joints of material being welded.

It has heretofore been common practice in the welding arts to apply a back-up material to the under surface of members or parts to be welded. This material is secured in a suitable manner along the joint gap formed by the members to be welded to prevent molten weld metal from passing through the joint gap. However, serious handicaps and disadvantages have been encountered in the use of prior art backing material.

Thus, for example, a solid copper strip or bar may be used for a backing. However, the joint fit-up of the elements to be welded must be aligned or positioned within close tolerances if the underside of the root weld pass is to be uniform. This is a costly and time-consuming operation since in many instances complicated structures require extensive machining of both the back-up and the elements to be welded for proper fit-up. Also, copper pickup into the weld is often encountered, which must be removed by the extensive grinding of the underside weld face.

Solid steel material is also used as a backing material. This material becomes an integral part of the weld joint after welding. The use of such backing material also requires close fit-up in order to eliminate bad notches and defects which can result in weld cracks.

Backup materials of prior art loose particles such as flake iron powder and granular iron powder have heretofore produced undesirable root welds because the weld metal penetrated into this backing and resulted in welds having a rough and convex underside. This convex underside forms a bead which entraps slag which must be removed by laborious and costly methods or else covered upon subsequent weld passes. Slag remaining in the weld joint causes joint weaknesses and possible failure. Pure silica sand, another loose particle material, produces a thick slag layer between the backup and weld which is very difficult to remove. Silica inclusions are picked up by the weld metal and lower the impact properties of the weldment. Backing particles formed by commercial steel shot result in welds which hot crack through the center area. This cracking probably is caused by the weld pickup of carbon, phosphorus and sulfur from the shot.

It is therefore an object of the present invention to provide a loose particle backing material which will compensate for poor fit up and misalignment of material to be welded.

It is a further object of the present invention to provide a backing material which results in weld having a flat to concave underside which does not entrap slag.

Another object of the present invention is to provide a backing material which improves the quality of a weld, and which prevents the penetration of the welding material into the backing material.

In the drawing referred to below, we have shown a preferred embodiment of our invention, which is given by way of example and not by limitation.

In the drawing:

FIG. 1 is a cross sectional view of two members to be welded together with loose backing particles of the present invention held in the joint gap of the two members.

FIG. 2 is a cross sectional view of one of the spherical, specially coated, metallic particles used in the joint gap of FIG. 1 as a backing material.

FIG. 3 is a cross sectional view of the two members of FIG. 1 and the root weld pass with the backing removed.

FIG. 4 is a cross sectional view of two members welded together with the root weld utilizing a prior art solid backing bar.

Referring now more particularly to the drawings in which like reference characters refer to like parts, FIG. 1 discloses two elongated metallic members 1 and 3 such as manganese-molybdenum armor plate to be welded together. These members have been positioned side by side and have opposed beveled edges which form therebetween what is known in the art as a double-V groove. Obviously, the edges could be prepared to form a double-U or other well known type groove. In order to accomplish the objects of the present invention, an elongated holding strip 5, which may be self-adhesive, is secured to the underside of elongated members 1 and 3. This strip is flexible and can be used on members having curved surfaces without any special preparations, such as machining. As shown, the strip 5 is wide enough to extend from one member to the other to form a support for the specially prepared loose particle backing material 7, described below, which is placed in the groove formed between elements 1 and 3. FIG. 2 shows a cross sectional view of a single particle of the backing material 7. This material is formed from small spherical steel shot 9 which is covered with a coating 11 having a melting point substantially higher than that of the shot for a purpose described below.

The following are typical compositions of some of these shot 9:

| Type of Steel Shot | Chemical Composition of Shot (Percent) | | | | | | | | | |
|---|---|---|---|---|---|---|---|---|---|---|
|  | C | Mn | Si | Ni | Mo | V | S | P | Cr | Fe |
| Managnese-molybdenum Armor Shot—30 +40 mesh | .27 | 1.80 | .70 | .54 | .53 |  | .022 | .007 |  | Remainder. |
| Electrode Shot Spec. MIL 230-16—30 +40 mesh | .08 | 1.00 | .32 | .75 | .30 | .10 | .022 | .003 |  | Do. |
| A-632 Steel Shot —40 +50 mesh | .08 | 1.33 | .50 | 1.32 | .42 |  | .016 | .016 | .12 | Do. |
| A-675 Steel Shot —30 +40 mesh | .10 | .95 | .45 |  |  |  | .025 | .025 |  | Do. |

To produce a coating on these shot which melts at a higher temperature than the shot itself, a high temperature aluminum paint can be utilized. This paint can have the following composition:

|  | Percent |
|---|---|
| Aluminum paste | 22.5 |
| Petroleum resin | 19.3 |
| Coal tar solvent | 8.6 |
| Petroleum spirits | 49.6 |

Before applying the coating, the shot, which are substantially spherical and equal in size, have their surfaces acid-cleaned. The shot are placed in a suitable container after which an appropriate amount of the paint is added. The container is closed and agitated until all of the shot particles are completely covered with a thin layer of the paint. The amount of aluminum paint required to coat the shot is approximately 4 lbs. per ton of shot and is less than 0.2 percent of the shot in weight. After the coating, the shot is baked at 325° F. for one hour. Most of the resin, solvent, and petroleum spirits are driven from the aluminum paint during this baking period, leaving essentially a thin layer of aluminum which will oxidize readily.

A typical shot particle is shown in cross section in FIG. 2 wherein the spherical steel shot is shown with the aluminum oxide coating 11 adhering to the outer surface of the shot 9. This coating melts at a temperature of 2015° C., substantially higher than the melting temperature of the steel shot listed in the schedule above.

Before the welding is begun, the holding strip 5 is applied to the underside of members 1 and 3. An appropriate amount of the shot is placed in the groove formed by the edges of the plate members on the holding strip. As shown in FIG. 1, the shot particles are poured to fill the lower V of the double-V groove and so that the top layer of particles is level with the root of the groove.

With the backing thus in place the root weld is placed in the groove on the backing. The intense heat utilized in depositing the welding metal in the groove will melt at least the uppermost layer of the backing particles. The oxidized aluminum coating on the shot will substantially increase the surface tension of the uppermost initial thin layer of molten shot that will give necessary support to the slag layer which will be formed between the weld metal and the backing material. This slag comes in part from the electrode during welding and backing material. The viscosity of this slag layer is substantially increased by the shot coating and the slag layer holds up the weld metal in the center of the root gap long enough to wet the sides of the base metal. The cohesive forces between the supporting molten backup material is greater than the adhesive forces between the backup material and the base metal, and thus, a convex meniscus is formed by the molten backup material. This convex meniscus favors the wetting of the sides of the base metal by the weld metal to create a weld with a concave underside. Thus, the surface of the molten backing material and the slag layer of increased viscosity play important roles in obtaining a weld contour which will be flat to convex and will not form a bead to entrap slag.

The shape of the backing particles also plays an important role in forming welds having concave underside. The spherical particles 12 when placed in the groove provide many heat insulating air pockets. Thus, the loose particle backing material 7 will not conduct heat as efficiently and quickly as the base metal. When the molten weld is placed in the groove, it readily flows along and wets the heat conductive faces of the base metal while the less conductive backing tends to resist weld penetration.

The backing particles 12 should also be similar in size to produce a fairly smooth concave underside. This is because weld metal penetration, if any, in the backing becomes more uniform as size distribution of the backup particles is reduced. Thus, when particles 12 are all substantially equal in size, the under contour of weld 13 is relatively smooth when compared to a weld made using different sized backing particles.

When the weld material which has been placed in the groove of FIG. 1 hardens, the base metals 1 and 3 are joined. As shown in FIG. 3, portion 13 of FIG. 3 is the fused weld metal, while sections 14 on either side of the fused weld represent zones which have been affected by the heat used in applying the weld metal in the groove. As shown in FIG. 3, the weld hase the desired concave underside 15 with no slag entrapment. The slag layer (not shown) produced during the welding is fairly uniform in thickness and can be easily removed by scrubbing with a wire brush or by any well known method desired.

FIG. 4 shows a typical prior art weld 19 made using a metallic backing bar 17 which had to have machined faces 22 for close fit. The heat affected zones of members 25 and 26 are represented at 20. The weld 19 has a convex underface 23 which provides grooves that entraps thick slag layers 21. This thick slag is difficult to remove requiring a laborious and time-consuming filing process. Often slag particles which remain in the grooves are covered upon subsequent passes and result in a weakened weld. Furthermore, the metallic backing bar 17 itself may become fused with the weld metal and, if undesirable, will have to be removed by chipping and grinding.

*Summary*

It is believed that the most important aspect of the present invention is the coating of the shot surface with a material which will offer the optimum backing properties. The coating on the shot surface is responsible for the quality of the weld produced. Several possible effects of the shot coating are as follows:

(1) The viscosity of the slag layer between the backup and weld metal is increased by the shot coating so that the weld metal is held up in the weld junction long enough to wet the sides of base material.

(2) The surface tension of the thin molten layer of shot under the weld metal is increased and thus favors the wetting of the bevel faces by the molten weld metal because of the condition of lower surface tension existing in that area.

(3) The coating on the shot acts as an insulator, keeping heat in the weld junction longer than usual, thus favoring more wetting of the base metal bevel faces by the weld metal.

The total effect is believed to be a combination of the three effects listed above in addition to the particle shape and particle size homogeneity. Any coating which offers these properties will work satisfactorily. It is, of course, apparent that coatings other than aluminum oxide which exhibit the properties 1–3 above may be used to coat the spherical particles. One such coating is sodium silicate (water glass) which produces a concave undersurface but a thicker slag layer.

Having described our invention we claim:

1. In the construction of a joint wherein two ferrous members having a gap therebetween are to be welded together the combination comprising:

a removable substantially planar adhesive strip which is secured directly to each of said members, whereby said adhesive strip acts as a bridge and support member across said gap until the weld solidifies wherein it is thereafter removed;

a plurality of particles in intimate contact with said adhesive strip wherein said particles partially fill the gap space, and thereby provide a backing means for the weld;

said particles being formed of an inner portion of steel shot and an outer portion of oxidized aluminum, with said inner portion being in the range of −20 to +50 mesh;

said outer portion of said particles having a melting point higher than the inner portion, with the approximate melting point being at 2015° C. whereby upon the weld in said gap reaching the melting point of said outer portion, said outermost layer of particles will melt and increase the surface tension of the adjacent layer of particles thereby providing a molten smooth support surface for the weld material until the weld solidifies after which said backing and particles are removed.

2. The combination as set forth in claim 1 wherein said members to be welded have opposed vertical planar faces having a beveled portion adjacent said directly attached adhesive strip, thereby forming a trapezoid-shaped receptacle for said particles.

3. The combination as set forth in claim 2 wherein the weld is formed across said vertical planar faces, is concave in cross section, and blends into said beveled portions.

4. In a method of welding two abutting ferrous members the steps comprising:
   selecting two members having substantially vertical planar ends;
   beveling one edge of each of said members thereby forming a substantial relief from said vertical planar ends;
   applying an adhesive member, directly to each of said members whereby the gap therebetween is bridged and a trapezoid-shaped receptacle is formed;
   selecting steel shot in the range of —20 to +50 mesh, with said shot being previously coated with an oxidized aluminum coating;
   filling the formed receptacle with said coated steel shot to the point where said beveled portion begins, thereby forming a smooth support surface for the weld at the junction of the vertical planar surfaces and the beveled edges;
   fusion-depositing weld metal in and along said gap on the top layer of said shot; and
   removing said adhesive and shot upon weld solidification whereby a smooth concave weld surface is formed.

References Cited by the Examiner

UNITED STATES PATENTS

| | | |
|---|---|---|
| 2,033,240 | 3/36 | Hardy. |
| 2,068,658 | 1/37 | Cox. |
| 2,230,369 | 2/41 | Wise _____ 113—111 |
| 2,323,160 | 6/43 | Stecker et al. _____ 29—490 X |
| 2,331,689 | 10/43 | Hodge. |
| 2,362,505 | 11/44 | Smith. |
| 2,691,952 | 10/54 | Wilson et al. |
| 2,916,001 | 12/59 | Chyle et al. |
| 2,979,808 | 4/61 | Booth _____ 113—99 X |
| 2,985,411 | 5/61 | Madden. |

JOHN F. CAMPBELL, *Primary Examiner.*